Figure 1:
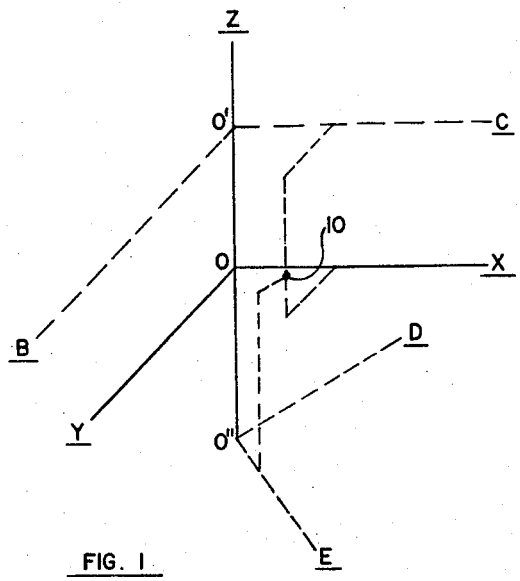

Oct. 25, 1966  J. J. FISCHER ETAL  3,281,582
NAVIGATION SYSTEM
Filed Aug. 9, 1962  2 Sheets-Sheet 1

INVENTORS
JOHN J. FISCHER
FRANK M. PELTESON
BY
Sidney Magnes
AGENT

Oct. 25, 1966       J. J. FISCHER ETAL       3,281,582
                        NAVIGATION SYSTEM
Filed Aug. 9, 1962                              2 Sheets-Sheet 2

INVENTORS
JOHN J. FISCHER
FRANK M. PELTESON
BY
Sidney Magnes
AGENT

United States Patent Office 3,281,582
Patented Oct. 25, 1966

3,281,582
NAVIGATION SYSTEM
John J. Fischer, Fullerton, and Frank M. Pelteson, Long Beach, Calif., assignors to North American Aviation, Inc.
Filed Aug. 9, 1962, Ser. No. 215,889
3 Claims. (Cl. 235—150.25)

This invention relates to a navigation system.

Background

In navigating commercial or private aircraft, the usual procedure is to pick up signals or visual sightings from the area beneath the aircraft, and to convert these signals and/or sightings into the aircraft's instantaneous position. In the past, the sightings and conversions have been performed by a human operator, with or without the use of mechanized equipment.

In fast-flying aircraft, different types of navigation techniques have become necessary. One of the most successful is the so-called "inertial navigation" system; this system depending upon the fact that a spinning gyroscope has an inertia that tends to maintain the gyro at its original orientation. As the aircraft accelerates, changes altitude or attitude, or turns, the deviations relative to the gyroscope's original position are sensed; and are converted into a form that provides the desired navigational information. Due to the high speed of the vehicle, this conversion is preferably performed by computers, so that the desired navigation information is available immediately and continuously.

One form of inertial navigation uses a "stabilized platform," wherein a plurality of gyroscopes cause the platform to be stabilized and maintained at its original (e.g., horizontal) orientation. (A fuller discussion of stabilized platforms is given in "Basics of Gyroscopes," volume 2, by Carl Machover.) Instruments known as "accelerometers" are mounted on the stabilized platform; one accelerometer being sensitive to acceleration in the up-down direction, another accelerometer being sensitive to acceleration in the forward-backward direction; and the third accelerometer being sensitive to acceleration in a sideward direction. Thus, the true accelerations of the aircraft can be detected—provided the stabilized platform remains horizontal.

It is well known that if a vehicle accelerates in a given direction at a given rate and for a given length of time, it will achieve a given velocity; and will cover a given distance during this interval. The conversion of acceleration to velocity and to distance is well known, and therefore will not be described in detail. Suffice it to say, the availability of the various accelerations permits suitable computers to provide navigation information such as the velocity, altitude, attitude, distance traveled, the instantaneous position of the aircraft, etc.

If an aircraft carrying one of these stabilized platforms were to take off from the North Pole, and circumnavigate the earth, the tendency of the stabilized platform is to try to remain in its original orientation. This means that at the North Pole the stabilized platform would be parallel to the surface of the earth at the North Pole; that at the equator the stabilized platform would tend to be perpendicular to the surface of the earth; and that at the South Pole the platform would again be parallel to the surface of the earth.

It is normally desirable however that the stabilized platform be positioned precisely parallel to the surface of the earth beneath it at all times; otherwise, the accelerometers would not measure the true forward-backward, up-down, and side-to-side motion of the aircraft.

It is therefore necessary that various corrections be inserted into the mechanism of the stabilized platform to re-orient it parallel to the surface of the earth, depending upon its position with respect to the poles and equator of the earth. Moreover, certain inaccuracies in the manufacture and operation of the gyroscopes and the stabilized platform cause various cumulative movements, which must be corrected.

As may be understood, it is necessary to do a great deal of sensing of the platform's orientation, computing what it should be, determining the required corrections, and feeding the necessary signals to the mechanism in order to suitably orient the stabilized platform at all times.

The equipment for suitably re-orienting the stabilized platform becomes very complex, heavy, and requires a great deal of room.

Objects and drawings

It is therefore the principal object of our invention to provide an improved inertial navigation system.

Figure 3:
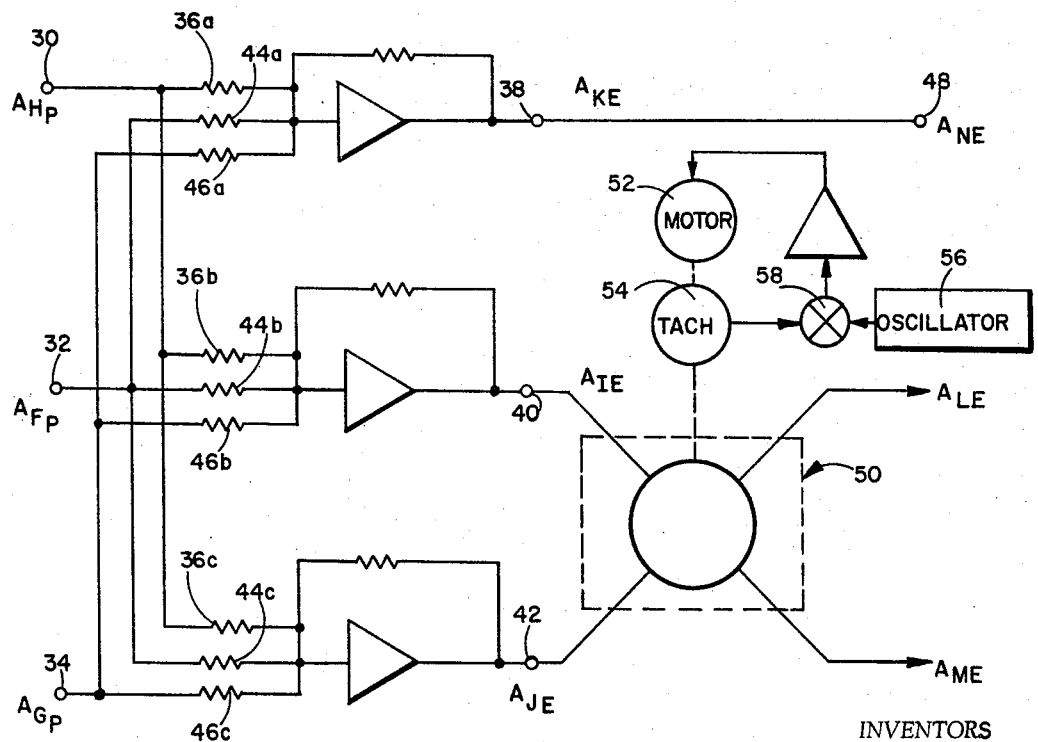
Figure 2:
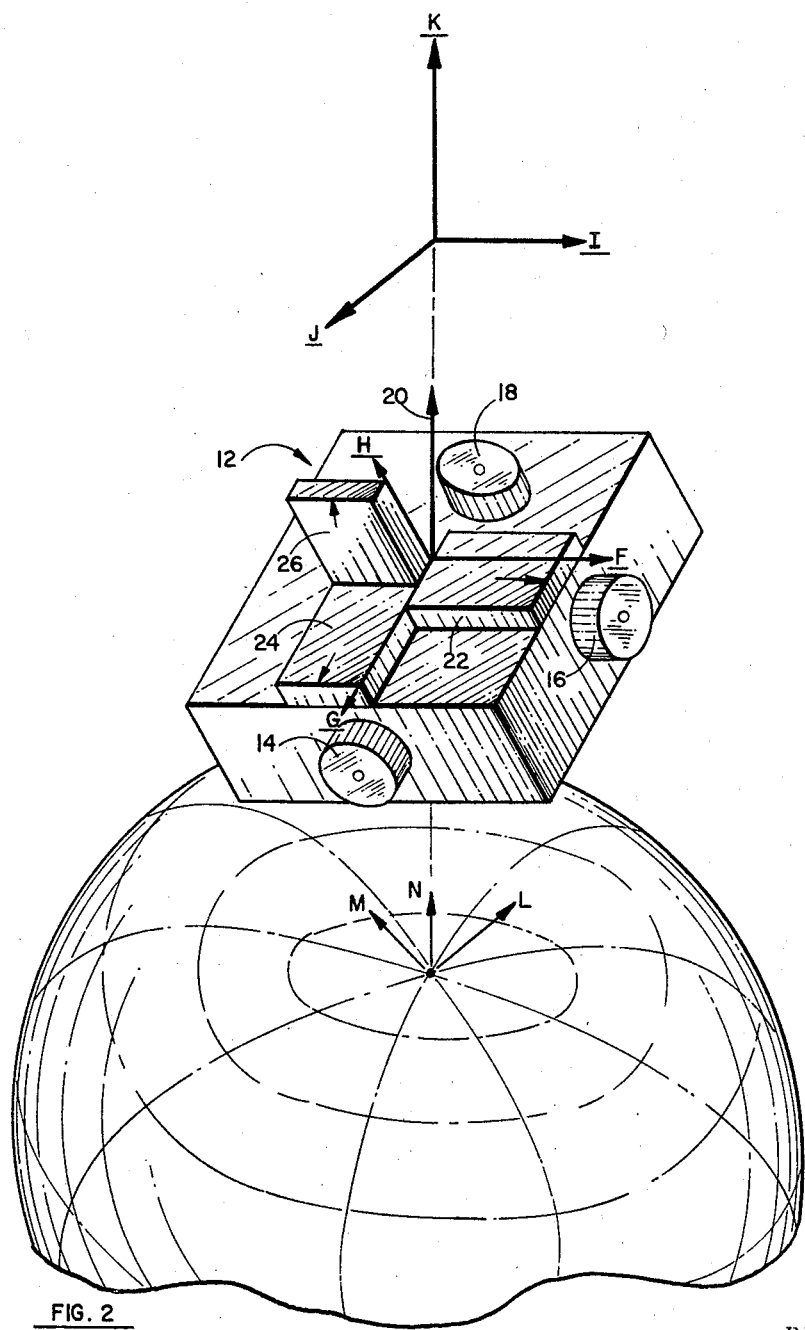

The attainment of this object and others will be realized from the following specification, taken in conjunction with drawings of which FIGURE 1 is a three-dimensional representation of various coordinate systems;

FIGURE 2 is a three-dimensional representation of our platform and its momentary relation to the earth; and FIGURE 3 is a schematic-and-block diagram of electronic equipment used in our invention.

Synopsis

Broadly stated, our invention comprises the concept of having a "quasi-stabilized" platform that—instead of always being parallel to the surface of the earth beneath it—rotates of its own accord about a given axis. For reasons to be explained later, the rotation axis is preferably positioned parallel to the "polar" axis that connects the North and South Poles of the earth.

Our quasi-stablized platform is permitted to rotate at its normal rate; and the accelerometers thereon have their output signals converted to signals that correspond to the latitude and longitude of the earth.

In this way, the difficult problem of maintaining a precisely-positioned stabilized platform is obviated, and the data from the accelerometers is converted to the desired form by a computer.

The feature of having the platform's rotation axis parallel to the polar axis of the earth eliminates the need for one conversion of the data, and thus further simplifies the necessary computations, computer, and other equipment, as well as saving space, weight, and complexity.

Introduction

In order to understand our invention, it is desirable that the reader understand the concept of "coordinate systems"; and this may be understood from FIGURE 1.

Assume that it is desired to specify the position of a point 10, which may represent the instantaneous position of an airplane. If there are three mutually perpendicular axes, X Y Z, that meet at a given point "O" known as the "origin," in order to reach point 10 one could leave the origin and move toward X a given distance; could then turn and move parallel to O–Y a given distance; and could move upward parallel to O–Z a given distance.

After all these movements have been performed, the person would be at the point 10; and the distances (known as the "coordinates") moved in the various directions would define the position of point 10 in the X Y Z coordinate system.

Assume now a second coordinate system comprising the mutually orthogonal lines O'B, O'C, and O'Z; these meeting at a common origin O'. The location of point 10 can also be designated in this new coordinate system by moving from O' towards C a given distance; then turing and moving parallel to O'B for a given distance; and then moving downward parallel to O'Z for a given distance.

As may be realized, the person performing these movements would again be at point 10. Thus, the point 10 may be designated in either X Y Z or the B C Z coordinate systems.

It is also possible to us a third coordinate system such as D E Z, which is rotatably displaced from the others. As may be seen from FIGURE 1, movement from the origin O" toward E, then upward parallel to O"Z, and then parallel to O"D would again bring the person to point 10.

Other coordinate systems that are skewed with respect to those shown, may also be used.

It may thus be seen that the location of a given point may be expressed in any one of a number of coordinate systems; and regardless of which system is used, the same point would be specified relative to the system used.

It is possible, by means of mathematical computations, to convert the coordinates of point 10 relative to one coordinate system to the coordinates of point 10 relative to any other desired coordinate system, when the relation between the two coordinate systems is known. Similarly, values—such as accelerations, velocities—may also be converted between various coordinate systems.

The mathematical conversion between systems involves the concept of a so-called "Eigenvector." This vector may be represented by a straight line whose direction is fixed and unchanging in two coordinate systems that are rotating relative to each other. Hence the Eigenvector denotes the axis of relative rotation between the coordinate systems.

The platform and its coordinate system

With the foregoing explanation of coordinate systems in mind, our basic inventive concept may be understood from FIGURE 2. This symbolically represents our quasi-stabilized platform 12 having three suitable gyroscopes 14, 16, and 18 that stabilize the platform as much as possible. As previously explained, our quasi-stablized platform is not corrected to compensate for various factors and to remain horizontal and parallel to the surface of the earth; and this results in a platform that—instead of being stabilized parallel to the surface of the earth beneath it—actually rotates, around an axis 20; which will therefore be known as the rotation axis.

It will be noted that platform 12 has its own inherent coordinate system; the axes denoted by vectors F, G, and H.

Mounted on platform 12 are three mutually orthogonal accelerometers 22, 24, and 26; each of which measures acceleration in the direction indicated by their respective arrows, which are in the direction of the F, G, and H axes of the platform's coordinate system.

Quasi-stabilized platform 12 is tested in the laboratory, and the position of its precession axis 20 is carefully noted, as described in U.S. Patent No. 3,127,774, issued April 7, 1964, "Means and Method for Determining the Direction of the Axis of Rotation of a Controllably Rotating Platform," filed November 8, 1961, by J. J. Fischer et al. When the platform is mounted in an aircraft, it is placed in gimbals in such a way that the precession axis 20 is parallel to the polar axis of the earth, as described in co-pending patent application 160,728, "Method and Means for Aligning an Axis on a Gimballed Platform," filed December 20, 1961, by J. J. Fischer et al.

If now the aircraft carrying the platform 12 were to rise vertically from the North Pole, each of the accelerometers 22, 24, and 26 would produce a signal; none of which would be a true indication of the vertical acceleration, but the combination of which can be mathematically resolved to indicate the true vertical acceleration.

Similarly, if the aircraft were to move in any other direction, the accelerometers 22, 24, and 26 would again produce output signals that can be mathematically resolved to indicate the true direction and rate of movement of the vehicle.

The Eigenvector coordinate system

It will be noted that an arbitrary coordinate system, I J K, can be fixed in the platform and that the K axis may be selected to be aligned with the polar axis of the earth. This means that the rotation axis 20 of the platform coincides with the K axis. For convenience the I J K coordinate system will be called the Eigenvector coordinate system, since the Eigenvector is seen to lie along the K axis.

In addition, the Eigenvector coordinate system may be positioned so that its I axis is above and in the same plane as the F axis, and its J axis is above and in the same plane as the G axis. Moreover, the Eigenvector coordinate system may, for simplicity, be assumed to rotate about its vertical K axis at the same rate as the platform coordinate system is rotating about its rotation axis 20.

Conversion of signals

As previously discussed, the instantaneous signal from the accelerometers in the F G H platform coordinate system may be converted to instantaneous signals in the I J K Eigenvector coordinate system. In view of the above assumptions relating to the positioning and rotation of the Eigenvector coordinate system, this conversion is a simple trigonometric relation involving angles between the F and the I axis, and between the J and the G axis, respectively.

Thus, the signals produced by vertical movement of the platform can be resolved into a single vertical signal, which will appear along the precession axis 20, or along the vertical K axis of the Eigenvector-coordinate system. Similarly, any other movement of the platform will produce accelerometer signals that can be converted to signals along the I and the J axis of the Eigenvector coordinate system.

Again, as previously discussed, the information in the I J K Eigenvector coordinate system may be converted to information in the earth's L M N coordinate system.

It should be noted that vertical movement measured along the Eigenvector I axis is exactly the same as vertical movement measured along the earth's N axis; so that no transformation is required for converting data from the Eigenvector system's vertical to the earth's vertical at the North Pole.

The computer

FIGURE 3 shows a schematic-and-block diagram representation of means for converting the information from the platform's coordinate system into the earth's coordinate system.

The outputs from the various accelerometers $A_{FP}$, $A_{GP}$, and $A_{HP}$ (i.e., Acceleration in the F, G, and H directions respectively of the Platform's coordinate system) are applied directly to input terminals 30, 32, and 34. A resistive network, comprising resistors such as 36, 44, and 46 provides the trigonometric conversion of the signals from the platform coordinate system to the Eigenvector coordinate system; the converted signal appearing at terminals 38, 40, and 42, and are now identified as $A_{KE}$, $A_{IE}$, and $A_{JE}$. The values of the resistors depend on the trigonometric relation between the platform and the Eigenvector coordinate system. Thus, an input, such as $A_{HP}$, is resolved into three components by means resistors 36a, 36b, and 36c; one component representing the vertical value, another component representing the side-to-side value, and the third component representing the backward-forward value. In a similar manner, resistors 44 and 46 resolve the other inputs. Thus, the three input acceleration components in the platform coordinate system are converted to three acceleration components in the Eigenvector coordinate system.

It is now necessary to convert the data from the Eigenvector coordinate system to the earth's coordinate system.

The data, $A_{KE}$, of the Eigenvector coordinate system at terminal 38 is the same as the data, $A_{NE}$, of the earth's coordinate system, and it is merely passed directly to output terminal 48.

Since the other two Eigenvector coordinate system's axes (I and J) are rotating relative to the earth, the data along their coordinate axes is converted to data along the earth's coordinate axis by a resolver 50 whose function is to break up the two Eigenvector signals into components that lie along the L and M axes of the earth's coordinate system. The outputs of the resolver are therefore the desired output signals.

The resolver is preferably driven by a constant speed motor 52, and revolves at a rate $W_E - W_P$; where $W_E$ is the rotational velocity of the earth and $W_P$ is the rotational rate of the Eigenvector system, which was assumed to be equal to the rotational rate of the platform as measured in the laboratory. The resolver is speeded-up or slowed down by a servo loop that controls the motor's speed by comparing the actual rotational speed, as measured by a tachometer 54, with the desired rotational speed as generated by means such as an oscillator 56. The error signal produced by comparator circuit 58 is then applied to the motor 52 in such polarity as may be necessary to control the speed of the resolver.

In this way, all movements of the vehicle are converted to movements in the earth's coordinate system. The vehicle carrying the platform 12 thus always has its navigation information up to date, regardless of the platform's position relative to the earth.

*Discussion*

It may thus be seen that placing the precession axis parallel to the earth's polar axis permits the direct conversion of information from the precession axis 20 to the earth's polar axis N; and thus permits the use of a simple resolver.

If, for some reason, the precession axis 20 were not parallel to the earth's polar axis, the computer would merely contain additional stages similar to the one shown in FIGURE 3. The first stage would convert the accelerometer outputs from the platform coordinate system into values for a first Eigenvector coordinate system; while the second stage would convert the data from the first Eigenvector system to the one shown in FIGURE 2.

The assumptions that the disclosed Eigenvector coordinate system was directly above, and rotated at the same rate as the platform, permit the use of the resistor-and-amplifier combination shown. If this assumption were not made, a first rotational conversion between the platform and the Eigenvector system would be necessary, and the resolver would then involve the rotational rate of the Eigenvector system relative to that of the earth.

Although the invention has been described and illustrated in detail, it is to be understood that the same is by way of illustration and example only, and is not to be taken by way of limitation; the spirit and scope of this invention being limited only by the terms of the appended claims.

We claim:
1. A navigation system comprising:
an inertial platform having an uncompensated drift rotation about a predetermined rotation axis, said platform mounted in a vehicle with said rotation axis positioned substantially parallel to the polar axis of the earth;
a plurality of accelerometers mounted on said platform and having orthogonal sensing axis which define a coordinate system,
and means for converting the output of said accelerometers into signals proportional to coordinates of another coordinate system having one axis parallel to said rotation axis and the polar axis of the earth.

2. A navigation system comprising:
an inertial platform having an uncompensated drift rotation about a predetermined rotation axis, said platform mounted in a vehicle with said rotation axis positioned substantially parallel to the polar axis of the earth;
a plurality of accelerometers mounted on said platfor mand having orthogonal sensing axis which define a coordinate system,
means for converting the outputs of said accelerometers to signals proportional to coordinates of another coordinate system having an axis parallel to said rotation axis,
and means for converting said signals proportional to coordinates in said other coordinate system to signals proportional to coordinates in the earth's coordinate system.

3. A navigation system comprising:
an inertial platform having an uncompensated drift rotation about a predetermined rotation axis; said platform mounted in a vehicle with said rotation axis positioned substantially parallel to the polar axis of the earth;
three accelerometers mounted on said platform having mutually orthogonal sensing axis defining a first coordinate system;
means for converting the output of said accelerometers into signals proportional to coordinates of a second coordinate system having one axis coaxial with said rotation axis and the remaining axis coplanar with a corresponding axis of said first coordinate system and means converting signals in said second coordinate system into the earth's coordinate system.

References Cited by the Examiner

UNITED STATES PATENTS

| | | | |
|---|---|---|---|
| 2,953,858 | 9/1960 | Wrigley | 33—226 |
| 2,953,926 | 9/1960 | Wrigley | 33—226 |
| 2,977,804 | 4/1961 | French | 33—226 |

MALCOLM A. MORRISON, *Primary Examiner.*

K. W. DOBYNS, *Assistant Examiner.*